No. 871,810.  
PATENTED NOV. 26, 1907.

G. L. MORTON.  
PRODUCER GAS PLANT.  
APPLICATION FILED JAN. 21, 1907.

4 SHEETS—SHEET 1.

WITNESSES:

INVENTOR,  
GEORGE LOUIS MORTON,  
BY  
Attorney.

No. 871,810. PATENTED NOV. 26, 1907.
G. L. MORTON.
PRODUCER GAS PLANT.
APPLICATION FILED JAN. 21, 1907.

4 SHEETS—SHEET 2.

WITNESSES:
H. Berrigan.
John V. Horning.

INVENTOR,
GEORGE LOUIS MORTON,
BY H. van Oldenneel.
Attorney.

No. 871,810.  
PATENTED NOV. 26, 1907.  
G. L. MORTON.  
PRODUCER GAS PLANT.  
APPLICATION FILED JAN. 21, 1907.

4 SHEETS—SHEET 3.

WITNESSES:

INVENTOR,
GEORGE LOUIS MORTON,
BY
Attorney.

No. 871,810. PATENTED NOV. 26, 1907.
G. L. MORTON.
PRODUCER GAS PLANT.
APPLICATION FILED JAN. 21, 1907.

4 SHEETS—SHEET 4.

WITNESSES;

INVENTOR,
GEORGE LOUIS MORTON,
BY
Attorneys

UNITED STATES PATENT OFFICE.

GEORGE LOUIS MORTON, OF SUTTON COLDFIELD, ENGLAND.

PRODUCER-GAS PLANT.

No. 871,810.     Specification of Letters Patent.     Patented Nov. 26, 1907.

Application filed January 21, 1907. Serial No. 353,207.

*To all whom it may concern:*

Be it known that I, GEORGE LOUIS MORTON, a subject of the King of Great Britain, residing at Witham Bank, Four Oaks Common, Sutton Coldfield, in the county of Warwick, England, consulting engineer, have invented certain new and useful Improvements in and Relating to Producer-Gas Plants, of which the following is a specification.

My invention refers to improvements in and relating to producer gas plants, and has for its object the provision of improved means for the conversion of the hydro-carbon gases, evolved by heating fuel containing bituminous matter, into a fixed form of gas suitable for commercial purposes, such as running an engine on direct suction and other general uses. With such plants the fuel has hitherto been burned at the grate in the supply of oxygen taken in under the grate bottom.

In my invention I do not burn the bituminous fuel at the grate but distil it at a point removed from the grate, preferably above the latter, and to insure the fixing of the gases, I introduce an air supply about the point where distillation takes place.

The essential features in the construction are the provision of means above or removed from the grate for insuring a zone of very high temperature at the point where distillation is to take place and the provision of means for insuring the presence of carbondioxid at this point to take up the carbon freed on the break up of the gases, forming the monoxid which is the main constituent of the fixed gases.

Figure 1:
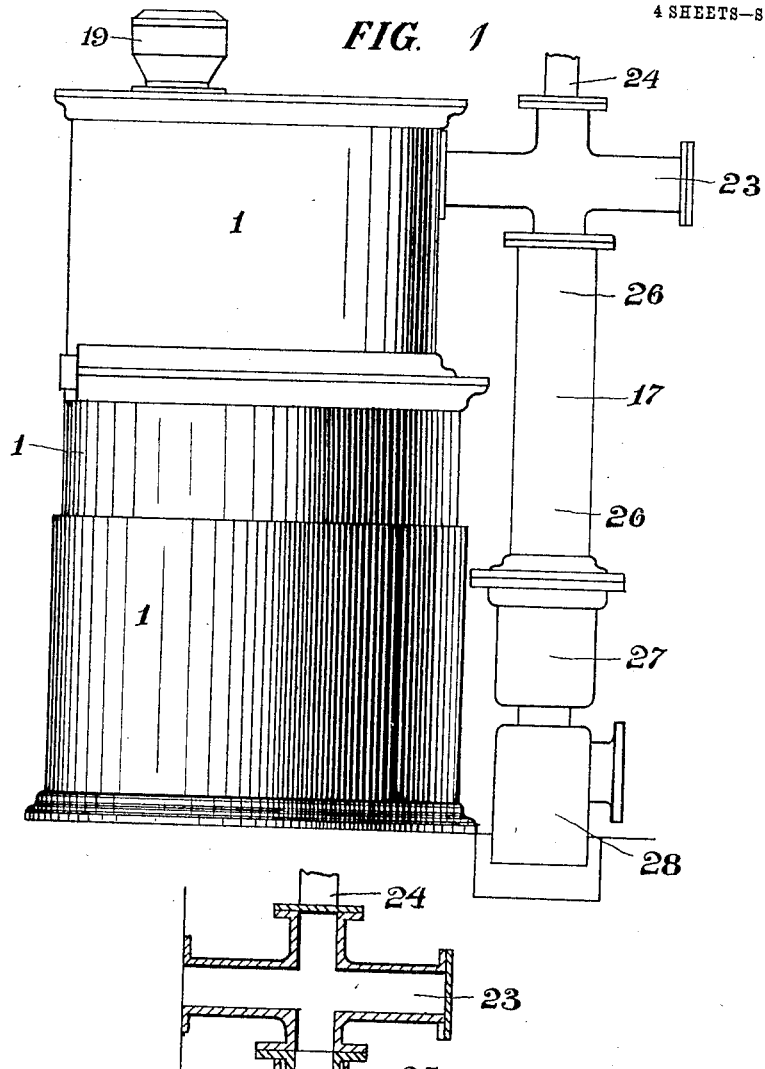
Figure 6:
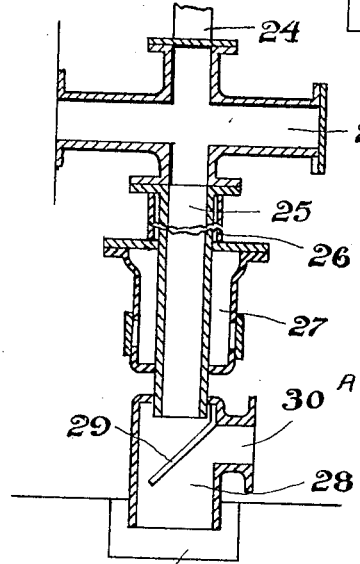
Figure 2:
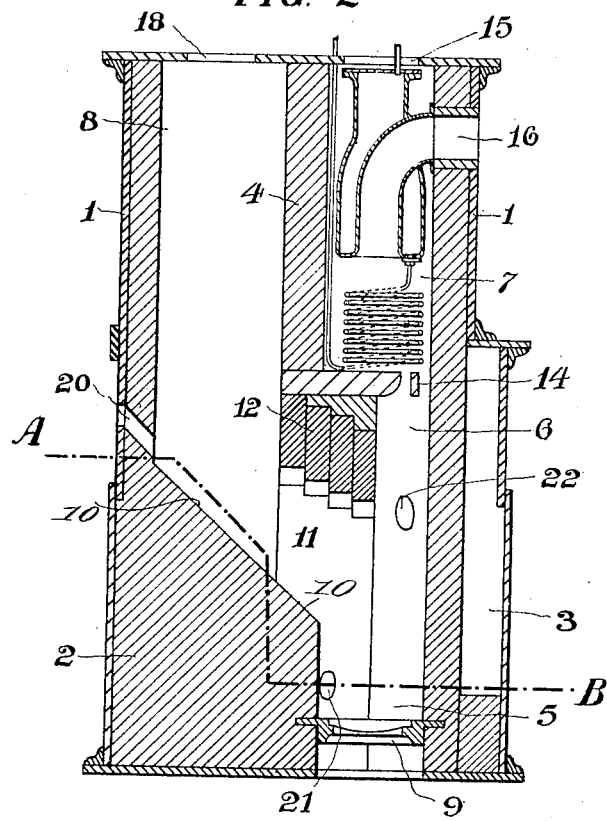
Figure 3:
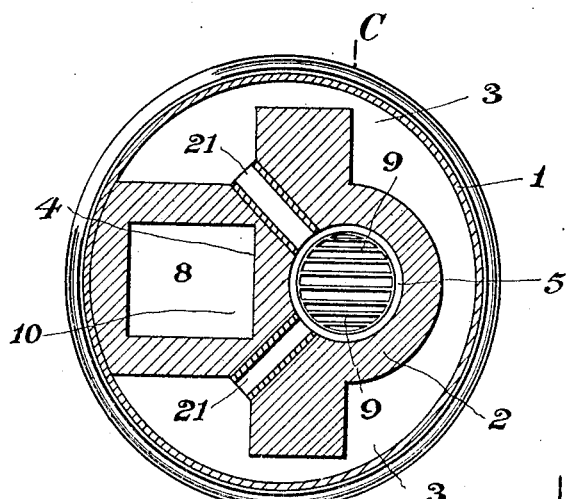
Figure 4:
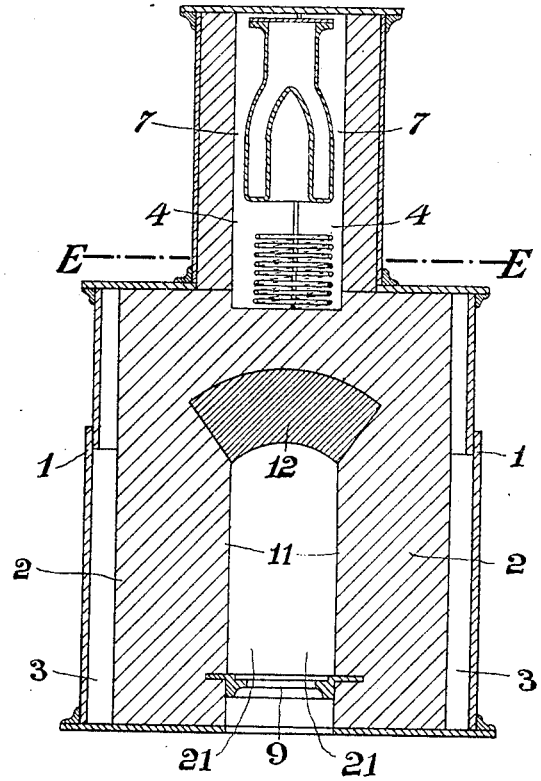
Figure 5:
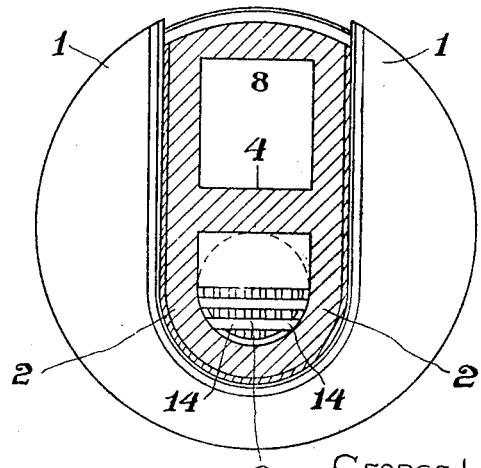
Figure 7:
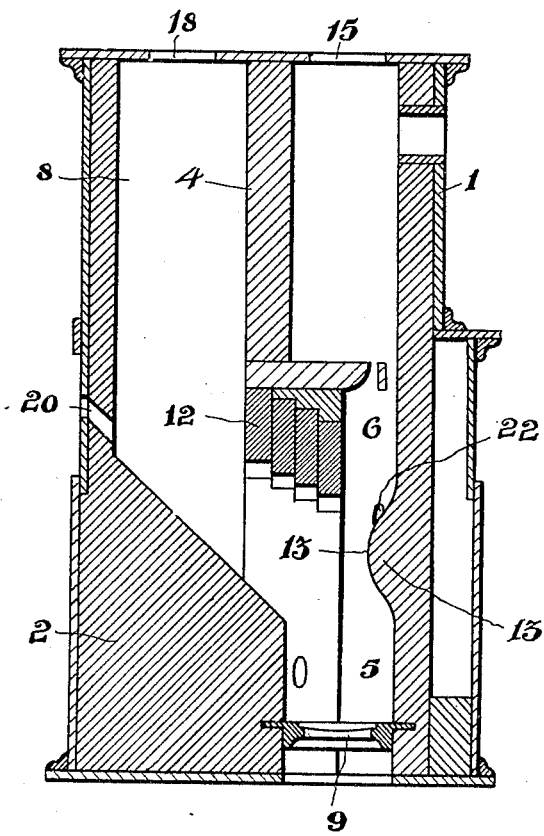

The objects of the invention are carried out in the manner illustrated on the drawings on which:

Figure 1 is an elevation of the producer with a cooling chamber; Fig. 2 is a vertical section of the producer; Fig. 3 is a horizontal section of the same on line A—B of Fig. 2; Fig. 4 is a vertical section of the producer at C—D of Fig. 3; Fig. 5 is a sectional plan taken on line E—F of Fig. 4; Fig. 6 is a vertical section showing a suitable cooling chamber; Fig. 7 is a vertical section of a producer showing the wall of the generator bulged or swelled.

The producer comprises an outer casing, 1, built up in sections in any suitable manner, and an internal lining, 2, of firebrick, or other refractory material, an air space, 3, being left between the casing 1 and the lining 2. The upper part of the lining 2 is divided by a central wall or partition, 4, into two parts; one of these parts forms a generating chamber, 5, conversion space, 6, and carbon trap while the other forms a fuel container or hopper 8.

In the generating chamber near the bottom is arranged the grate, 9, and below this is the usual ash pit and water lute.

The fuel container 8 is formed with a gradually curving or sloping wall or bed, 10, down toward the generating chamber so that the fuel in the container shall not lie, but move steadily on toward the generating chamber. The division wall 4 of the lining 2 is provided with an opening, 11, at the point where the fuel container and generator meet and this opening I preferably form arched and provide with a gradually stepped roof, 12, of firebrick, which projects into the space 5, and is formed to receive and radiate the heat from the grate, so that the latter properly meets the incoming bituminous fuel and by reason of such effective radiation forming at this point a zone of high temperature through which the hydrocarbons from the green fuel pass and are fixed. To assist in the leading of the hot gases from the grate to the afore-mentioned arch and prevent any tendency on their part to pass up direct to the conversion chamber 6 and through trap 7, without properly meeting and burning the incoming fuel, I may bulge or swell the firebrick wall of the generator as indicated, at 13 in Fig. 7.

In the space 7 a boiler may be arranged as shown for mixing with the air supply either above or below the grate. At the top an opening, 15, with a suitable cover for filling purposes is provided and through the wall and casing a little below this the gas outlet, 16, is formed from which the gas passes to a suitable cooling chamber, such as 17, which will be hereafter described.

The fuel container 8 has an opening, 18, at the top provided with a suitable hopper 19 for charging in fuel while near the bed another opening with a cover is provided for inspection purposes or to enable a rod to be introduced for stirring and moving the fuel down the sloped bed.

The cooler 17 shown on the drawings, but to which no claim *per se* is made, consists in an upper right angle pipe 23 having means for the connection of a purge pipe at 24. Projecting downwardly from the pipe 23 is a gas pipe 25 around which is an air jacket 27, the lower end of the gas pipe 25 finishing in a cleansing chamber 28 having a deflecting plate 29. This cleansing chamber 28 is in direct communication with a water tank 30 and has an outlet 30ᴬ.

The action of the generator is as follows: A fire is made on the grate 9 and coke charged in until level with the top of the arched opening in the division wall 4. This is then blown by a hand fan or the like until a bright clear fire is burning, the products of combustion passing away through the purge pipe. Bituminous fuel is then charged into the container 8 and this coming in contact with the hot fuel gives off hydrocarbon gases which have to pass through the zone of great heat, the conversion space 6, and are there fixed as permanent gas with a deposit of free carbon. This latter is taken up by the carbon di-oxid from the grate forming the monoxid which with the fixed gases from the fuel, forms the producer gas. The gas then passes through the trap 7 where any remaining free carbon is obstructed. The fuel from the hopper after the expulsion of the hydrocarbon gases will be more or less reduced to coke and in this condition falls through onto the grate in generator replacing the fuel used in starting the fire and forming a continuous feed.

The fixed gases pass through the carbon trap 7 and out at the outlet 16 to the cooler 17 where they are cooled down and cleansed. The heat taken from the gases in the cooler by the water jacket may serve the purpose of warming up the supply for the steam boiler or providing water for the lute.

The chambers for washing the gas (the usual scrubbers may be employed for this purpose) would be supplied with water drawn from a tank containing lime so that should any carbon dioxid pass through the conversion space and carbon trap it will be absorbed.

With the generator in operation the hydrocarbons (tar gas) from the green fuel are split up by the heat at the zone of high temperature and to prevent the carbon in which these gases are rich from being deposited in the generator and choking the same as has been the difficulty in previous producers, it is necessary that carbon dioxid $CO_2$ shall be the gas resulting from the burning of fuel at the grate 9. In comparatively small producers this is generally the case, but as the grate area increases carbon monoxid is the resultant gas owing to the fuel burning in an insufficient volume of oxygen. To insure the presence of $CO_2$ I use one or more twyers 21 and 22 above the grate through which air from the space 3 or otherwise is admitted, the supply being regulated in any known manner to suit the requirements. The air from these meets the carbon monoxid converting it to the dioxid, its conversion causing increase of temperature, which occurring at the point where the hot zone is required, considerably enhances the temperature at this point. The required $CO_2$ and also a big rise in temperature is thus obtained at the distilling and fixing point the dioxid taking up the carbon of the hydrocarbons and preventing its deposition in the generator.

The upper twyers 22 may be covered with the fuel from the grate as they serve the same purpose, that of effecting a rise in temperature and the provision of $CO_2$ at the fixing point.

Suitable inspection and like doors and other fittings are of course provided about the producer where required.

What I claim then is:

1. In a gas producer plant, a bituminous producer having a sealed fuel container and a generating chamber out of vertical line but meeting at a point well above the primary grate, with a radiating arch above the fuel entry at this point, and with upper twyers introduced near the space in the vicinity of the said arch for the purpose as stated.

2. In a gas producer plant, a producer comprising an outer casing, an inner firebrick lining and air space between the lining and the said casing, the firebrick lining being divided by a central wall into two main chambers, one comprising a generator, conversion chamber and a carbon trap, while the other comprises a fuel container; the said division wall having an opening about which the fuel container finishes with a sloping bed, and said wall having above said opening a radiating arch.

3. In a gas producer plant, the combination of an outer casing an inner divided lining, an air space between said lining and said casing, a grate near the bottom of the producer, a primary air supply near the said grate, a radiating arch well above the grate and an additional air supply between said grate and said arch, the said dividing lining forming chambers, one comprising a generator and the other a fuel chamber and at the point of meeting of the two chambers the said arch is formed.

4. In a gas producer having a generator, a fuel container and a conversion chamber, the combination of a radiating arch at the point of entry of the raw fuel into the generating and conversion chambers, with deflecting protuberances on the wall of the producer for forming the hottest zone at a point above the level of the grate.

5. In a gas producer, a bituminous producer having a generating space, conversion chamber and carbon trap at the same vertical plane, a fuel container in an adjacent vertical plane with a divisional firebrick wall, the said generating chamber and fuel container communicating by an opening in the said dividing wall at the bottom of the fuel container, the said container having a sloping bed and the said opening having a radiating arch projecting well into the generating space, the producer further having supplemental twyers well above the grate.

In testimony whereof, I have signed my name to this specification in the presence of two subscribing witnesses.

GEORGE LOUIS MORTON.

Witnesses:
F. GILBERT BRETTELL,
STANLEY BANNER.